United States Patent [19]

Uyama

[11] Patent Number: 5,560,011
[45] Date of Patent: Sep. 24, 1996

[54] COMPUTER SYSTEM FOR MONITORING A USER'S UTILIZATION PATTERN TO DETERMINE USEFUL TASKS

[75] Inventor: . Masashi Uyama, Tokyo, Japan

[73] Assignee: New Media Development Association, Tokyo, Japan

[21] Appl. No.: 224,575

[22] Filed: Apr. 7, 1994

[30] Foreign Application Priority Data

Oct. 19, 1993 [JP] Japan .................................. 5-261289

[51] Int. Cl.$^6$ ...................................................... G06F 15/38
[52] U.S. Cl. .............................................. 395/700; 395/12
[58] Field of Search ............................... 395/12, 75, 600, 395/650, 700

[56] References Cited

U.S. PATENT DOCUMENTS

| | | | |
|---|---|---|---|
| 5,241,674 | 8/1993 | Kuorsawa et al. | 395/600 |
| 5,295,230 | 3/1994 | Kung | 395/75 |
| 5,390,281 | 2/1995 | Luciw et al. | 395/12 |
| 5,412,758 | 5/1995 | Srikanth et al. | 395/75 |
| 5,463,696 | 10/1995 | Beernink et al. | 382/186 |

*Primary Examiner*—Kevin A. Kriess
*Assistant Examiner*—John Q. Chavis
*Attorney, Agent, or Firm*—Armstrong, Westerman, Hattori, McLeland & Naughton

[57] ABSTRACT

With the purpose of automatically and efficiently finding and selecting a collection of software functions truly useful for a user from a collection of software functions and of adequately and easily judging whether the software function selected by the user should be adopted or not, the computer system according to the present invention comprises task description holding means for holding a collection of task descriptions formally describing individual utilization patterns of various types of software functions, and filtering means for finding and selecting a task description describing a utilization pattern, not tried by the user in the past and regarded as useful for the user, from a collection of task descriptions held by said task description holding means and for disclosing it to the user. By adding the task description selected by the filtering means to a task model, said task model can be changed during task execution.

3 Claims, 10 Drawing Sheets

FIG.4

```
{ TASK DESCRIPTION
41～{TASK NAME{READ<NEWS NEWS> RELATED_TO_THE_TV_PROGRAM} NEWSPAPER}
42～{CONDITION DESCRIPTION
45 ～{STARTING CONDITION
        {METAPHOR EVENT NEWSPAPER {}}
        {
           {METAPHOR REPLY TVSET "DISPLAY"}
           {EXECUTE TASK TVSET "WATCH < NEWS ARTICLE $ ID >"}
        }
     }
46～{ STARTING CONDITION EXPLANATION
        {1. YOU WANT NEWSPAPER, WON'T YOU?}
        {2. YOU ARE WATCHING NEWS ARTICLE ON TELEVISION RIGHT NOW.}
        {3. NEWSPAPER WILL BE PREPARED BY COLLECTING THE NEWS RELATED TO
     }     THIS ARTICLE AND IT WILL BE SHOWN TO YOU.}
47～{PREPARER NAME { TV VENDOR}}
48～{COMMENT
        { TELEVISION AND NEWSPAPER CAN BE USED IN LINKAGE.}
        { YOU ARE WATCHING NEWS ARTICLE ON TELEVISION RIGHT NOW.}
        { YOU CAN READ ALL ARTICLES RELATED TO THIS NEWS USING THE
     }    NEWSPAPER.
49～{ GUARANTEE GRADE C }
     { RECOMMENDATION
50 ～{ RECOMMENDATION REASONS
52 ～{RECOMMENDER NAME UYARNA FRIEND 21. OR. JP }
53  ～{COMMENT
            {IT MAY BE CONVENIENT WHEN INTERESTING EVENTS ARE PICKED UP
              FROM TELEVISION AND RELATED INFORMATION IS SEARCHED IN
            } NEWSPAPER.}
51 ～{RECOMMENDATION GRADE E
     }
   }
43 {ACTION DESCRIPTION
     {VARIABLE DECLARATION {}}
     {SEQUENTIAL
        {EXECUTE TASK {} "RETRIEVE<NEWS$NEWS>RELATED TO < NEWS ARTICLE
          $ID>"}
        {EXECUTE TASK NEWSPAPER "SHOW <NEWS$NEWS>"}
        {EXECUTE TASK NEWSPAPER "READ <NEWS$NEWS>"}
     }
     { PREPARER NAME {TV VENDOR}}
     { VERSION 1.1}
44 }
   { STATUS TERM ADOPTED }
 }
```

FIG.8
(1) NEWSPAPER METAPHOR ENVIROMENT
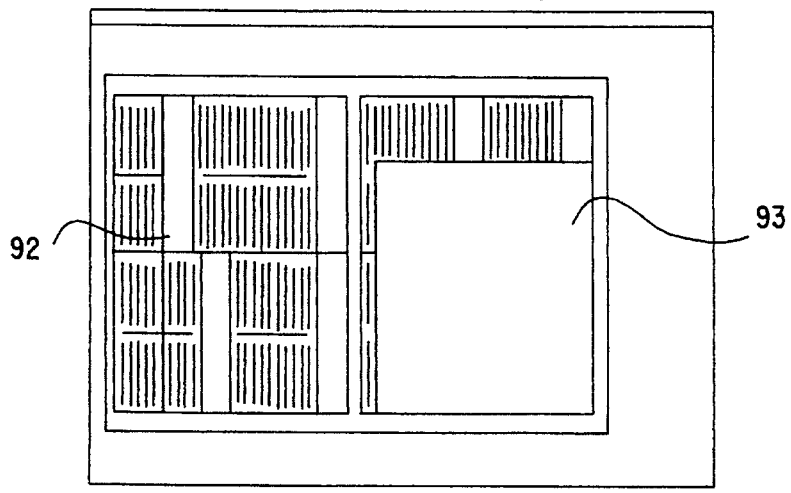
(2) APPEARANCE OF TELEVISION ICON
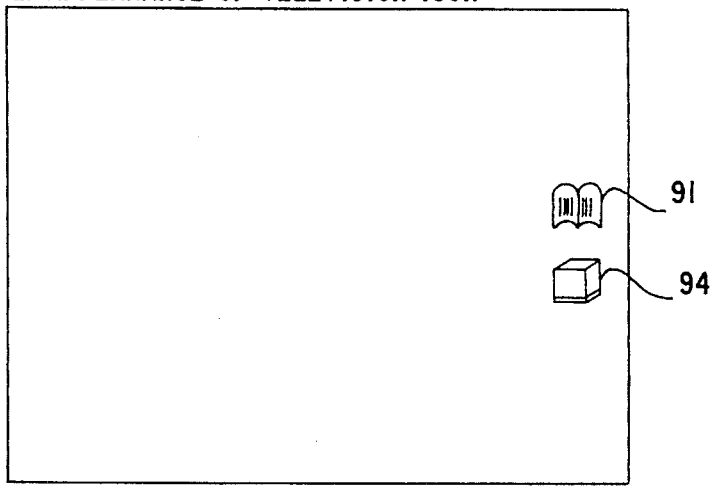
(3) DISCLOSURE OF THE FIRST FUNCTION
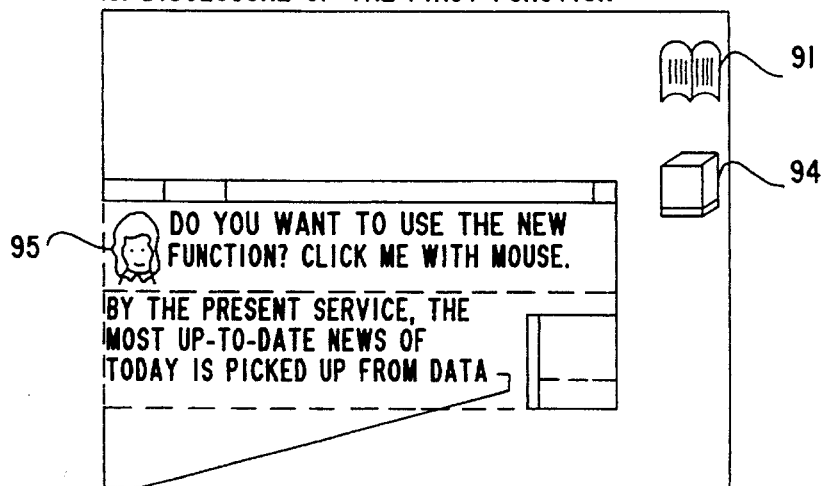
DO YOU WANT TO USE THE NEW FUNCTION? CLICK ME WITH MOUSE.
BY THE PRESENT SERVICE, THE MOST UP-TO-DATE NEWS OF TODAY IS PICKED UP FROM DATA BASE. YOU CAN READ THE NEWS THUS PICKED UP IN FORM OF A TELEVISION PROGRAM. ---TV VENDOR

FIG. 9
(4) CLICKING OF NEWSPAPER ICON
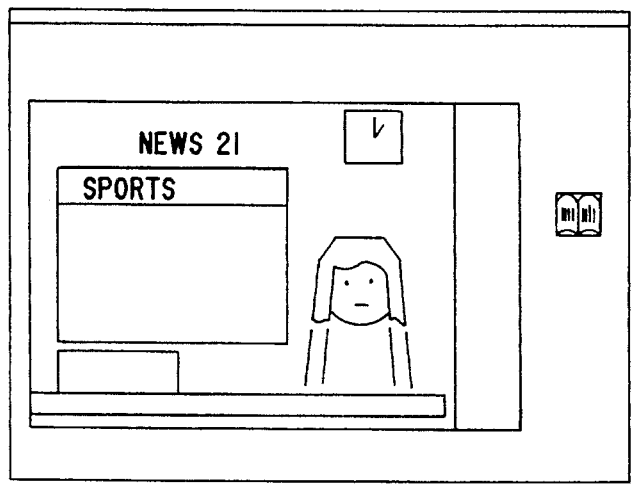
(5) DISCLOSURE OF THE SECOND FUNCTION
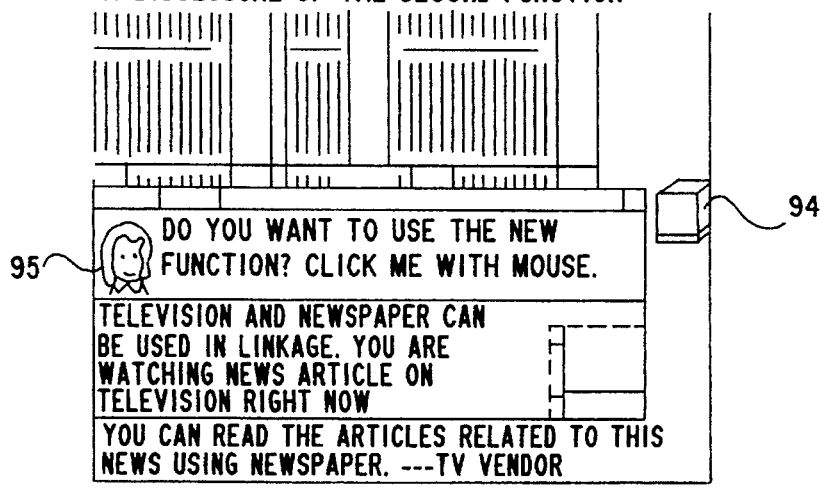
(6) SELECTION OF ADOPTION AND NON-ADOPTION
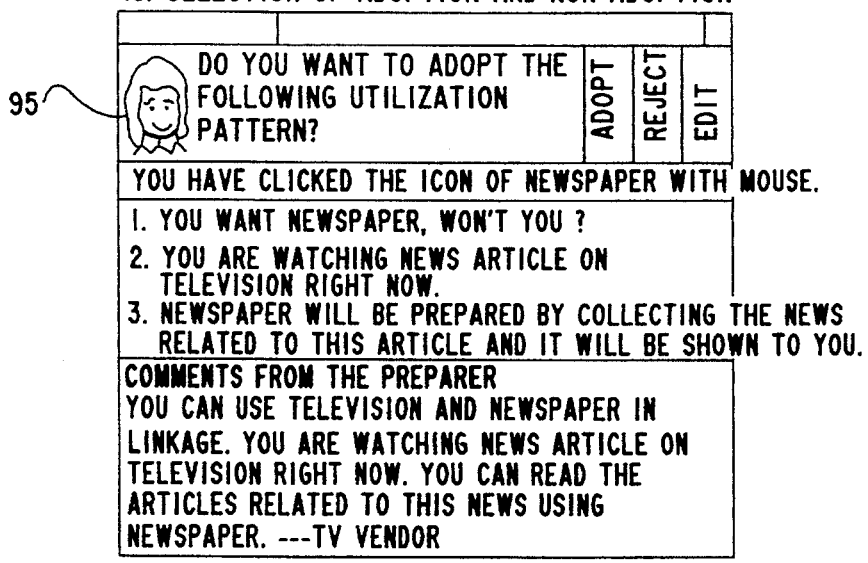

COMPUTER SYSTEM FOR MONITORING A USER'S UTILIZATION PATTERN TO DETERMINE USEFUL TASKS

BACKGROUND OF THE INVENTION

The present invention relates to a computer system having a filtering mechanism for finding and selecting only a collection of software functions useful for a user from a collection of physically available software functions provided by a number of software developers.

In the computer-oriented society of today, new software functions are increasingly developed, and versions of conventional software are updated day by day. Here, software function does not mean software package or software product itself provided by the developers, but it means individual function provided in form of software. For example, in a software product in a front-end processor, which works for conversion of kana (Japanese vernaculars) and Kanji (Chinese characters), a software function called "kana and kanji conversion" is prepared. In a newspaper metaphor environment, which presents data obtained from retrieval of data base to a user in form of newspaper articles, at least the following three functions are contained: a function to present the data obtained by retrieval of data base to a user in form of a newspaper article, a function to turn pages of the newspaper, and a function to magnify and display content of the article. That is, the developers are offering a single software function alone or a plurality of software functions as software package or software product.

The newly designed software function has many possibilities in the sense that it offers chances to overcome old practices and to increase competitive force for the users. On the other hand, it is very difficult to find and select software functions useful for the user while evaluating the software functions because there are enormous numbers of new software functions. It is needless to say that such situations occur in a stand-alone computer system, while it is more remarkably found in the so-called open network environment, in which the user cab have access to software functions of the other computer systems via computer network.

Under such circumstances, there are strong demands on a filtering mechanism, which serves as a "screen (sieve)" for finding and selecting a collection of software truly useful for the user from a collection of physically available software functions provided by a number software developers The concept of the filtering mechanism can be explained as described below in connection with FIG. 10. A software developer 13' develops new software functions and releases new versions of conventional software functions. These make up a collection of software functions as shown by reference numeral 18'. For a user, however, not all of these software functions are useful. Then, it is necessary to extract a collection of software functions 19' truly useful for the user 5' by filtering the collection of software functions 18' through a screen 6'. The filtering mechanism serves as such screen 6'.

However, the operation to find and select the software functions useful for the user is not enough for a filtering mechanism. Certainly, newly designed software functions offer chances to overcome old practices. On the other hand, these functions request the user to give labor force to change and reorganize the pattern of task execution, which the user has been organizing up to that moment.

Here, the pattern of task execution means an operating procedure, by which the user executes the task. Taking an example in the execution of a task to prepare a slip, in case a user utilizes a software function A to a certain extent and then utilizes a software function B to complete a slip, it is not that all users prepare slips by the same procedure, but some users complete slips by utilizing only the software function A, while some other users may utilize other software function C. That is to say, when executing a task, each individual user usually executes by the procedure determined by himself.

As described above, the user organizes his own task execution pattern in order to efficiently execute the task. In case new software functions are utilized, the task execution pattern up to that mement is no longer achievable in most cases because the software function offers new function. As a result, it is necessary to newly reorganize task execution pattern.

From such viewpoints, it is necessary for the filtering mechanism to give full consideration not only on finding and selecting of a candidate for the software functions, which appear to be useful for the user, but also on balance with two demands of the users, i.e. a demand "to want to maintain their patterns of task execution" and a demand "to want to increase personal ability by receiving good solution offered by new technology".

Based on the above, it is necessary for the filtering mechanism to satisfy the following three requirements:

(1) There is relative benefit. That is, the new software functions found and selected by the filtering mechanism must be such that conventional task execution pattern of the user is improved by adopting such functions.

(2) Reorganizing must be accomplished with less labor. That is, the new software functions to be found and selected by the filtering mechanism must be such that the user requires the least labor for reorganizing his task execution pattern when adopting such functions.

(3) Easiness to assess. That is, when adopting the new software functions, the user must be able to subjectively judge and trade off within short time, i.e. how the conventional task execution pattern can be improved and how much labor the user needs by adopting the new software functions.

With the above requirements, the present applicant proposed a computer system for performing operations based on the context of user's task execution on a task model and filed Japanese Patent Application 5-5602. The basic arrangement of this application is shown in FIG. 11.

In FIG. 11, a computer system 1' comprises task model holding means 2', context information holding means 3', and task execution means 4'.

The task model holding means 2' holds a task model, which is a collection of data acquired by modelling task execution pattern of a user 5', and the context information holding means 3' is to hold context information, which is knowledge to represent context of task execution of the user 5'. Concrete aspects of the task model and context information will be described in detail in the examples later. In FIG. 11 the words "task model" is entered in the block for the task model holding means 2', and the words "context information" are entered in the block for the context information holding means 3'. These were given to facilitate the understanding by simply entering content of the information held by these holding means. In the following, the same applies to the means for holding information.

The task execution means 4' sequentially calculates context information from input operation series of the user 5' using a task model held by the task holding means 2', makes access to the context information holding means 3' and updates context information held by the context information holding means 3'. The task execution means 4' referes to the task model and the context information with respect to operation input of the user 5', and estimates and interprets which task the user 5' is requesting. From a collection 18' of physically available software functions, a function suitable for the context of task execution is started. Further, referring to the task model and the context information, the results of execution of said function are converted to an expression to pre sent to the user 5'.

In the conventional computer system 1' as shown in FIG. 11, the context of task execution of the user 5' is identified by referring to the task model, and only the software function suitable for the context can be selected from the collection 18' of the physically available software functions.

As an example to actualize such computer system 1', there are POISE system or various types of active help systems.

In POISE system, knowledge analyzed and prepared with respect to office work using a collection of specific software products is given in advance as a task model by a system designer, and it is possible to identify context of task execution of the user and to provide support along said context. However, with the knowledge obtained from task analysis at a certain time point, it is not possible to add new software products or to cope changes of the task itself of the user associated with such addition.

Also, various types of active help systems are also designed according to the knowledge of a given domain, e.g. a method to utilize UNIX system, a method to utilize Emacs editor, etc., and it is not very easy to add knowledge newly.

In contrast to the POISE system or conventional active help systems, the present applicant proposed in the Japanese Patent Application 5-5602 as described above as follows: To actualize the computer system as shown in FIG. 11, an arrangement is proposed, which includes a studio manager agent, a bit arbiter agent, and a dialog manager agent, whereby a collection of agents give or take task phase descriptions via studio using studio functions, and the bid arbiter agent assesses bid messages based on context under the control of the studio manager agent so that agents are operated according to mutual context.

In so doing, when new software functions are added, it is possible to integrate the newly added task descriptions to task model because a mechanism to utilize the newly added software functions is provided while maintaining task execution pattern of the user as practical as possible. As a result, without changing the previous knowledge of the user, the newly added software functions can be utilized, and more portions of task requests of the user can be solved.

Although it is possible by the computer system proposed by the present applicant in Japanese Patent Application 5-5602 to solve many problems in conventional techniques, it is not judged who is the developer of the new software functions, which become an issue in practical application, when bid arbiter agent assesses the bid. In other words, it is not judged whether the new functions have been prepared by a reliable developer or not. Also, in case it is assessed as agreeing with the context as the results of bidding, the new functions are added immediately without giving opportunity for trial use for the user, and this may lead to the results to bother the user.

As described above, there have been growing demands on a system, which can provide support to the user efficiently when the user tries to find and select only the software function truly useful for the user from an enormous collection of physically available software functions, whereas there has been none, which can completely solve such problems.

SUMMARY OF THE INVENTION

To solve the above problems, it is an object of the present invention to provide a computer system which is extremely useful when a user adopts new software function.

To attain the above object, the computer system according to the present invention comprises task model holding means, context information holding means, and task execution means such as a conventional type computer system shown in FIG. 11, whereby there are further provided task description holding means and filtering means.

Here, the task description holding means holds a collection of task descriptions. A task description formally describes individual utilization pattern of software functions, and the filtering means finds and selects task descriptions, which describe utilization patterns not yet used on trial by the user and regarded as useful for the user, from a collection of task descriptions held by the task description holding means, and discloses them to the user.

As described in Claim 2 of the invention, the filtering means may be provided with a context-sensitive selection mechanism and a context-sensitive disclosure mechanism. Or, as described in Claim 3 of the invention, there may be provided context-sensitive selection mechanism, a selection mechanism based on reliability, and a context-sensitive disclosure mechanism.

Here, the selection mechanism based on reliability selects a task description prepared or recommended by reliable persons who have been selected according to reliability evaluation values explicitly determined by the user from a collection of task descriptions, which have not been used by the user on trial. The context-sensitive selection mechanism selects task description suitable for context of the current task execution using said context information. The context-sensitive disclosure mechanism provides the user with an opportunity to use utilization pattern of task description selected by the context-sensitive selection mechanism or the combination of said mechanism and the selection mechanism based on reliability among the contexts for actual task execution.

Therefore, the system according to the present invention comprises task description holding means for holding a collection of task descriptions formally describing individual utilization patterns of various types of software functions and filtering means for finding and selecting a task description, which the user has not yet used on trial and which is considered as useful for the user, from a collection of task descriptions held by said task description means, and discloses it to the user. Accordingly, it is possible to change the task model at the time of task execution by adding as task description selected by said filtering means to said task model.

In so doing, from an enormous collection of physically available software functions, a collection of software functions truly useful for the user can be automatically and efficiently found and selected, and the user can adequately and easily judge whether the software function is acceptable or not through trial use of the software function thus selected.

BRIEF DESCRIPTION OF THE DRAWINGS

FIG. 4 is an example of task description in an embodiment of the present invention;

FIG. 8 is a drawing for explaining an example of a context-sensitive disclosure in an embodiment of the present invention;

FIG. 9 is a drawing for explaining an example of a context-sensitive disclosure in an embodiment of the present invention;

DESCRIPTION OF THE PREFERRED EMBODIMENTS

In the following, description will be given on the features of the present invention in connection with the drawings.

Figure 1:
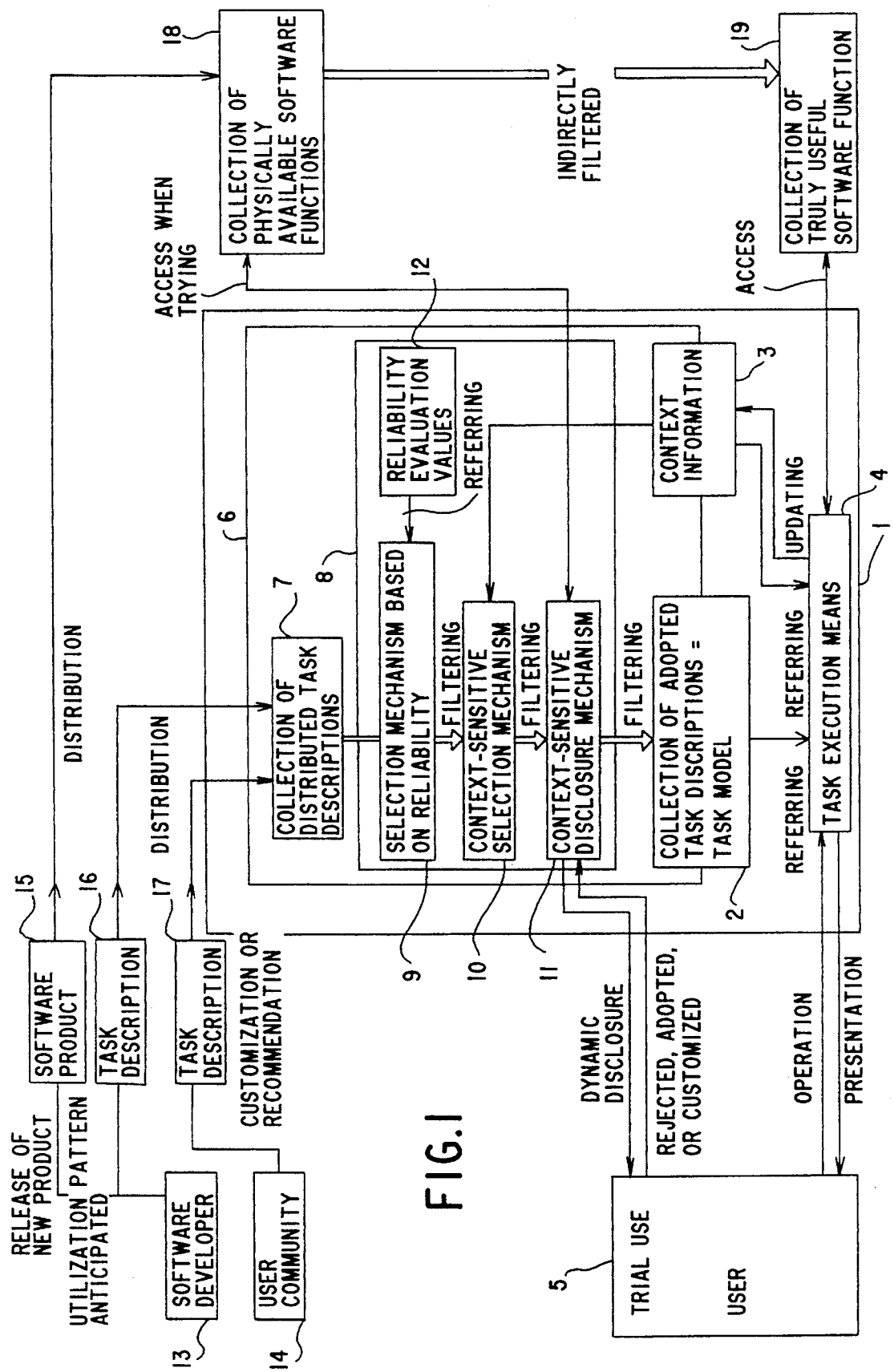
FIG. 1 shows an arrangement of a computer system according to an embodiment of the present invention.
Figure 11:
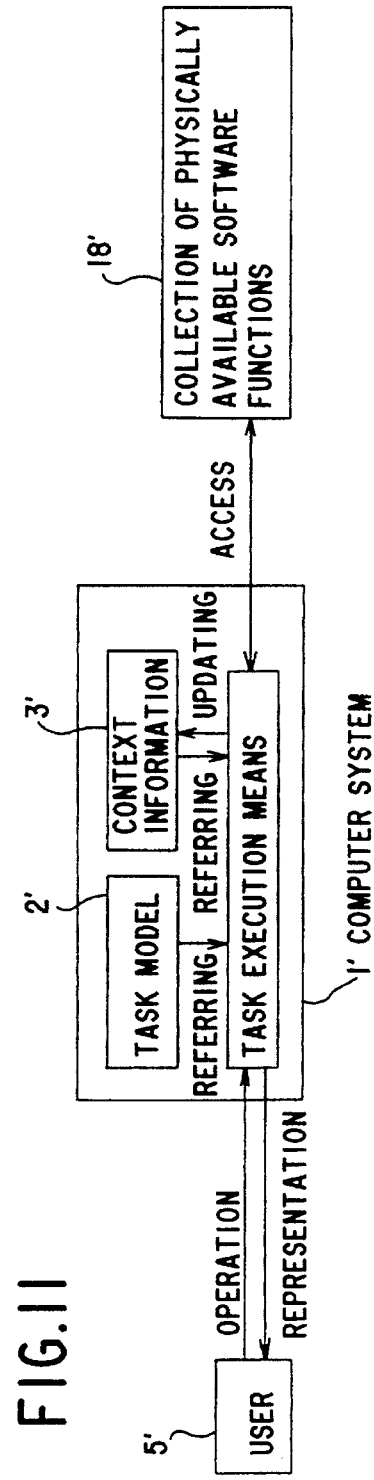
FIG. 11 is a drawing showing an arrangement of a conventional type computer system.

FIG. 1 shows an arrangement of the present invention and the surrounding condition associated with it as defined in the claims of the invention. In the conventional type example shown in FIG. 11, a computer system 1 comprises task model holding means 2, context information holding means 3, task execution means 4, and a filtering mechanism 6.

Here, a task model held by the task model holding means 2 is a knowledge, which is modeled after task execution pattern of a user 5. In the present invention, the task model is a collection of task descriptions already adopted as described later.

The context information held by the context information holding means 3 is a knowledge representing context of task execution of the user 5. Specifically, context information expresses which operation or processing has been performed in term of time series when the user 5 wants to execute a specific task. In other words, context information aligns varous types of information in time series, i.e. the information as to which input device was used for input operation, what software function was started, which sub-task was executed or in which output form the results of execution of software function were presented, etc.

Figure 3:
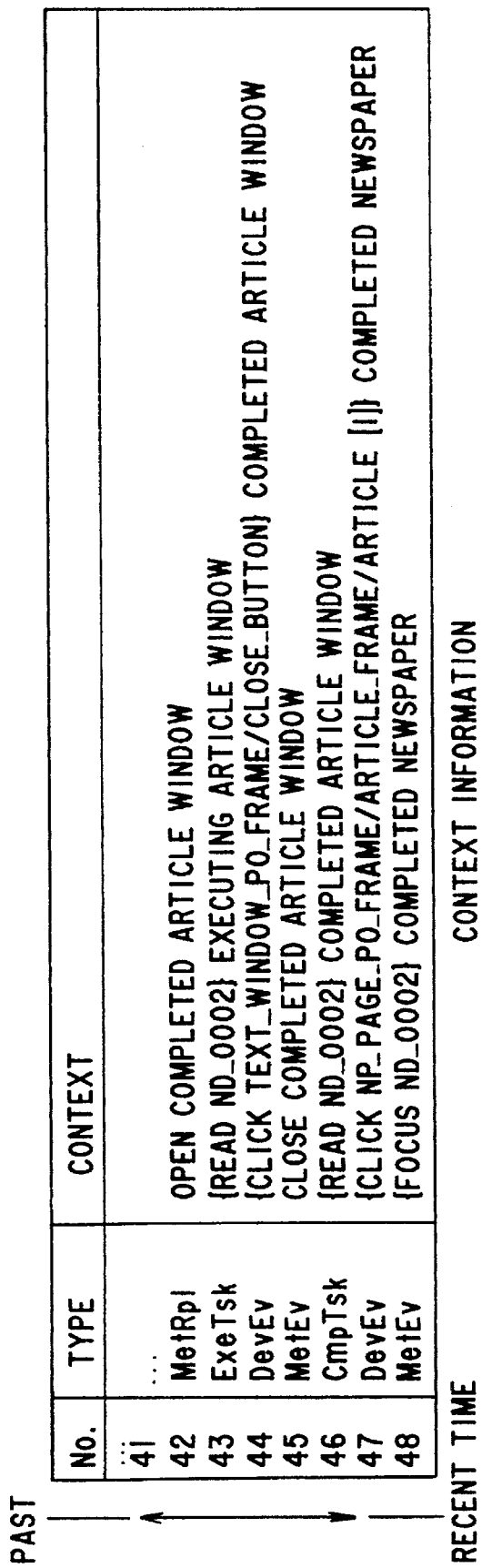
FIG. 3 shows an example of context information in an embodiment of the present invention.

FIG. 3 gives an example of the context information in an agency model, which is to be described later. In FIG. 3, messages in the agency model are provided with the numbers in generating order, and type and content of each message are described. FIG. 3 shows an example of context information in case the user executes the task by interacting with metaphor environment (a GUI described later). In the types of messages, "MetRpl" means that the message is a "Metaphor Reply" message. "ExeTSk" means that it is an "Execute Task" message. "MetEv" means that it is a "Metaphor Event" message. "DevEv" means that it is a "Device Event" message. "CmpTask" means that it is a "Complete Task" message. Here, it is not important which meaning the type or the content actually has. Thus, detailed description is not given here, and only the structure of the context information is described.

The task execution means 4 refers to the task model, sequentially calculates context information from operation series of the user 5, and updates context information held by the context information holding means 3. The task execution means 4 refers to task model and the context information, estimates and interprets the task to be executed by the user 5 from operation input of the user 5, and from the physically available software functions 18, and the software suitable for the context information is started. Further, the task execution means 4 converts the result of execution of the software function to an expression for presenting to the user 5, referring to the task model and the context information.

The filtering mechanism 6 is a superior mechanism, which at least contains the task description holding means 7 and the filtering means 8 as described in the claims.

Here, the object of filtering in the arrangement of FIG. 1 is not a software product 15 offered from a software developer 13, but it is task descriptions 16 and 17 distributed and offered with respect to the software product 15. The task description is a formal description, which defines utilization pattern and utilization method of the software functions and is provided by the software developer 13 or other user 14, and it is held by the task description holding means 7.

The task descriptions 16 and 17 are used as objects of the filtering from the following reasons: First, the user, who adopted the new software function, does not use the function alone, but it is incorporated as a part of the task execution pattern used up to the moment. Thus, it appears that the usefulness of the function when it is incorporated in a specific utilization pattern and used is closer to the interest of the user and is easier to evaluate than the usefulness of the function alone. Therefore, in the present invention, not the individual software functions, but task description, i.e. information description of utilization pattern of the software function, is adopted as the object for the filtering.

As described already, the task descriptions 16 and 17 are offered by a software developer 13 or by other user 14. Here, the software developer 13 estimates how the software product 15 he developed will be used in the task of the user 5, and offers it as the task description 16.

On the other hand, the other user 14 can prepare the task description 16 offered from the software developer 13 to a condition easier to use according to utilization pattern of his own. This is defined as customizing the task description. The user can distribute the customized task description 17 to the user 5 in the surrounding except himself. Thus, the task description 17 offered from the other user 14 is often more useful than the task description 16 offered by the software developer 13 himself because the user 14 in the surrounding has more chances than the software developer 13 to know task execution pattern or preference of users, and can design the task description suitable for the condition specific to the user 5.

The task description distributed and held on the task description holding means 7 is then sent to the filtering means 8. In the filtering means 8, the task description describing utilization pattern, which has not yet been used by the user 5 and which is considered as useful for the user 5, is found and selected from the task descriptions held by task description holding means 7, and it is disclosed to the user 5.

Here, as examples of the filtering means 8, two types of selection mechanisms 9 and 10 as well as one type of disclosure mechanism 11 are shown. By the selection mechanism 9 based on reliability, only the task description prepared or recommended by reliable developer or user, as selected by reliability evaluation values explicitly specified by the user 5, is selected. The reliability evaluation values are held by reliability evaluation value holding means 12.

Next, in the context-sensitive selection mechanism 10, only the task description suitable for context of the current task execution of the user 5 is selected according to the context information held by the context information holding means 3. Further, in the context-sensitive disclosure mechanism 11, new utilization pattern is dynamically disclosed in actual task execution of the user 5, referring to context information, and an opportunity to use the new utilization pattern on trial is offered to the user 5.

After using the new utilization pattern in actual task execution, the user 5 judges whether the task description is adopted or not, and customizes when necessary. In this way, only the task description ultimately adopted by the user 5 is selected, and the task description is added to a collection of the adopted task descriptions, i.e. task model held by the task model holding means 2. For this reason, the user 5 can have access only to the software functions 19, which have been used already on trial and which have been confirmed of their usefulness, during task execution.

It would be easily understandable that filtering of a collection of distributed task descriptions held by the task description holding means 7 is indirectly equal to filtering of a collection 18 of new software functions. Therefore, a collection 19 of truly useful software functions is filtered from a collection 18 of physically available software functions.

Next, description will be given on an actual arrangement when the arrangement of FIG. 1 is actualized using an agency model, referring to FIG. 1. In explaining the example, detailed description will be given on component elements of the present invention, i.e. task description, selection mechanism based on reliability, the context-sensitive selection mechanism, and the context-sensitive disclosure mechanism.

Figure 2:
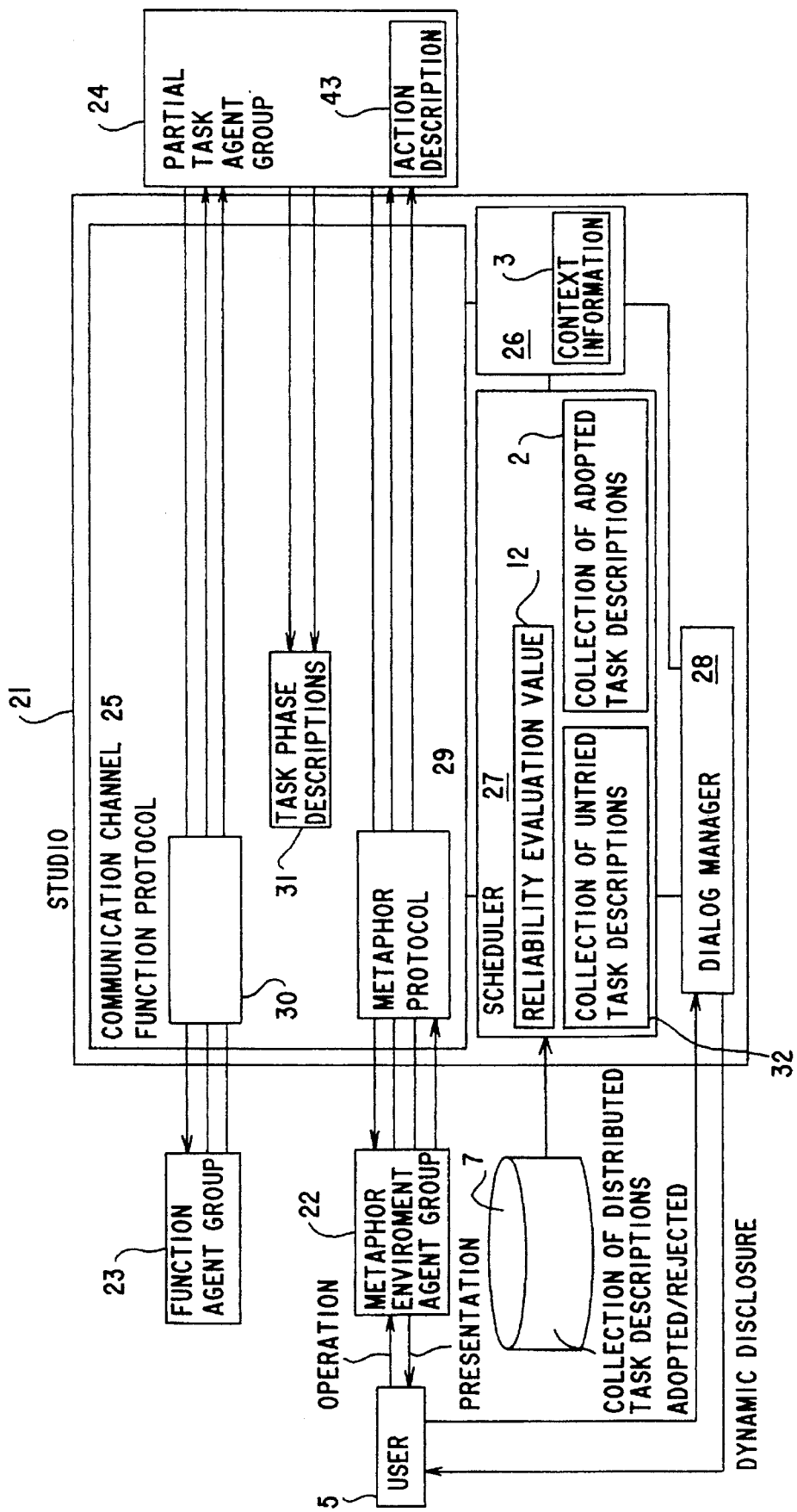
FIG. 2 represents a computer system of an embodiment of the present invention by agency models.

First, in FIG. 2, a studio 21 is a common place, which corresponds to a blackboard in a blackboard model. Specifically, the studio 21 is a work memory area where various information consisting of messages and data for dialog between function modules are read as a common medium to be accessed from a plurality of function modules.

A metaphor environment agent group 22, a function agent group 23, and a partial studio agent group 24 are module groups, which have predetermined element functions and autonomically perform information processing. These agent groups 22, 23 and 24 communicate by exchanging messages through a communication channel 25 of the studio 21. The studio 21 has not only the communication channel 25 between agents but also the functions for selection based on reliability, context-sensitive selection and context-sensitive disclosure. For this sake, it is provided with a studio manager 26, a scheduler 27, and a dialog manager 28 as system agents.

In the meantime, the user 5 executes the task by interacting with metaphor environment. As metaphor environment, a graphical user interface (GUI) comprising a metaphor environment agent group 22, i.e. a collection of metaphor environment agents, may be used. This metaphor environment agent group 22 has an appearance and operation method similar to those of object in actual world such as newspaper article, television program or VCR controller.

In response to the operation of the user 5, the metaphor environment agent group 22 sends metaphor event message to the partial task agent group 24. At the same time, a device event message showing which input device was used in the user's operation is sent to the communication channel 25 of the studio 21. Also, in response to a metaphor command message from the partial task agent 24, the metaphor environment agent group 22 changes the appearance to the user, i.e. metaphor environment, and as a reply to it, a metaphor reply message is sent to the partial task agent 24. The forms of these messages, i.e. device event, methaphor event, metaphor command, and metaphor reply messages, are defined by a metaphor protocol 29 determined for each type of metaphor.

The function agent group 23 offers basic function group for task execution of the user 5. Function is started in response to a function command message from the partial task agent group 24, and a function reply message is sent back. The function agent group 23 sends a function event message spontaneously according to status change of internal clock. The forms of these messages, i.e. function event, function command, and function reply, are defined by a function protocol 30 determined for each type of functions.

The partial task agent group 24 is an autonomic calculation unit for executing a part of the task of the user 5. When started, this partial task agent group 24 divides the task into actions according to action description 43 (details will be described later) in the task description. Each of the divided actions is transmission of function command message, transmission of metaphor command message, change of agent internal status, or starting of sub-task. The starting of sub-task is actualized as calling of local procedure. The partial task agent group 24 transmits a task phase description message to the studio 21 when the task execution is started or it is completed. As the task phase description message 31, there are execute task message and complete task message.

Next, description will be given on context information.

Of the above message groups delivered to the communication channel 25 of the studio 21, i.e. the message such as device event, metaphor event, metaphor command, metaphor reply, execute task, complete task, function event, function command, and function reply, the history of all messages will be accumulated in the context information holding means 3. The history of messages represents context of task execution of the user, and this is the context information.

When the history of messages is accumulated in the context information holding means, operation is performed as follows: When a certain message is generated, this message is first sent to the studio manager 26, which is a system agent. Upon receipt of the message, the studio manager 26 accumulates this message at the context information holding means 3 as the newest context information, adding it as the context information already accumulated. Then, the studio manager 26 transfers the message to the agents 22, 23 or 24, which are proper receivers of the message.

FIG. 3 shows an example of the context information accumulated by the studio manager 26 in the present arrangement example. As shown in FIG. 3, the above various messages are accumulated in time series in the generating order in the context information, and serial number is put on the message in the present example.

Next, description will be given on task description.

As described above, task description is the object of filtering in the present invention, and it is a formal description to define utilization pattern of software functions. It is distributed and provided by the software developer or other user. The structure is given in FIG. 4.

FIG. 4 shows an example structure of the task description relating to television metaphor environment. The task description comprises a task name 41, a condition description 42, an action description 43, and a status term 44. Here, the task name 41 is a name representing the task. The condition description 42 defines which condition should be satisfied by the context information when the task specified by the task name 41 can be started. The action description 43 defines the action after the task specified by the task name 41 has been started. The structure of the task description can be formally defined by BNF, for example.

Here, there exists only one action description 43 for the same task name 41, while 0 or 1 or more condition descriptions 42 can be described. The fact that the condition description 42 has 0 task description means that said task is not started by the status of the context information. That is, the task of this type is started only when it is executed passively as a sub-task from the other task. To a certain action description 43, not only the developer himself, but other developer who prepared it or user can prepare another condition description 42.

The status term 44 indicates whether the task description has not been tried by the user, or whether it has been adopted or not, and it has one of the values of "untried", "adopted" or "rejected".

It is the condition description 42 which plays an important role in the filtering mechanism. The condition description 42 comprises a starting condition 45, a starting condition explanation 46, a preparer name 47, a comment 48, a guarantee grade 49, and 0 or 1 or more recommendation reasons 50.

The starting condition 45 is a formal description to define the condition where the task can be started. The form of the starting condition 45 is:

> Starting condition::="starting condition"# trigger # context condition

When the message of the pattern specified by a trigger term is delivered to the communication channel 25 shown in FIG. 2, it means that the task can be started if context condition is satisfied by context information. When a given message is generated at a given context, there are generally two or more task descriptions which satisfy the starting condition. Thus, the state where two or more task descriptions satisfying the starting condition exist is called conflict.

The starting condition explanation 46 explains the context satisfying the starting condition 45 in the word easy to understand for the user. The starting condition explanation 46 is used when context-sensitive disclosure mechanism (to be described later) confirms to the user whether task description is adopted or not.

The preparer name 47 is the name of a software developer or other user, who prepared the starting condition 45 and the starting condition explanation 46. In general, the preparer of task description differs between condition description and action description. In the following, if simply described as the preparer of task description, it means the preparer of condition description in the task description. In the selection mechanism based on reliability as described later, only the task description prepared by a reliable preparer, i.e. software developer or other user, is selected, using reliability evaluation values explicitly set by the user to each preparer.

The comment 48 is a brief message, by which the preparer appeals relative benefit by adopting utilization pattern defined by the task description to the user. In many software products currently available, there are manual or on-line help as the means for the user to know utilization pattern. However, the advantages obtained by adopting the utilization pattern are not always offered to the user in a form easy to understand, especially in case of non-commercial software products.

Under such circumstances, it is attempted in the present example to receive benefit when using the software more understandable for the user by introducing the comment 48 as means to overcome the above defects. This, the comment 48 is displayed when the new utilization pattern is disclosed to the user by the context-sensitive disclosure mechanism as described later. This is helpful when relative benefit of utilization pattern is evaluated by the user.

The guarantee grade 49 is a grade showing how far the preparer can guarantee on the presence of bug and the support system when the task description is utilized. For example, the grades A–E may be used. In the selection mechanism based on reliability in the present example, the guarantee grade 49 is also used when only the task description with high reliability is selected.

Recommendation reason 50 is sequentially added by community of the user. As already described, the user can recommend task description to other user. The recommendation reason 50 comprises a recommender name 52, a comment 53, and a recommendation grade 51. Here, the recommender name 52 is used in the selection mechanism based on reliability as in the case of the preparer name 47. The comment 53 is used in the context-sensitive disclosure as in the case of the comment 48 by the preparer. The grades such as C–E are used as the recommendation grade 51. This indicates the degree of responsibility of the recommender and is used in the selection mechanism based on reliability similarly to the guarantee grade in the present example.

The task represented by the task name 41 is disintegrated into smaller actions by action description 43. The fact that the task is executed by the partial task agent 24 in the arrangement example of FIG. 2 means that the action defined by the action description 43 is executed.

The following are brief descriptions of syntax for action description:

```
Action description :: "action description" # variable
             declaration # action # preparer name # version
    Variable declaration::= "variable declaration" # {"<"
    type name
             "$" variable name ">"} *
    Action      ::= single action | sequential action | loop
      Single action ::= function command | metaphor command |
                 sub-task execution | sub-task completion
                 "BREAK" | "CONTINUE" | "change
                 of internal status"
    Sequential action ::= ""SEQUENTIAL" # action*
      Loop      ::= "EVENTLOOP" # {trigger # action} *
Version :: = "version" # "numerial value defined by period"
```

Here, action means single action, sequential action or loop. Sequential action means that action string lower than SEQUENTIAL is sequentially executed by the partial task agent 24. Pair string of trigger-action lower than EVENTLOOP in the loop waits for generation of the message specified by the trigger, and when the message is delivered, the action term in pair is executed.

Next, description will be given on the selection mechanism based on reliability.

As described above, the selection mechanism based on reliability is a selection mechanism for selecting only task description prepared or recommended by a reliable other party as seen from the user.

Basic concept of the selection mechanism based on the reliability lies on the principle that a method to facilitate evaluation of the new software function, i.e. one of the methods to subjectively evaluate trade-off associated with adoption of a new utilization pattern within short time, is to refer to the view of the other user, who already adopted that particular utilization pattern. In particular, the reference should be made to the view of the user who has the content of the work, task execution pattern or taste similar to those of the user.

In the present arrangement example, the user can subjectively sets reliability evaluation value to the other user or developer so that it is held by the reliability evaluation value holding means 12. The reliability evaluation value is a value, with which the user subjectively evaluates how far the view of the preparer or the recommender of task description is useful as reference. For example, it can be expressed by an integer of 0 to 10. Specifically, the reliability evaluation value to the preparer or the recommender, not explicitly set by the user, is the minimum value, i.e. 0. On the contrary, for the preparer or the recommender, whom the user places full confidence, the highest value of 10 may be specified. In the arrangement example shown in FIG. 2, the reliability evaluation value holding means 12 can be actualized as a part of the scheduler 27, which is a system agent.

It is easily understandable as fully significant that reference is made to the term of the preparer name in task description, i.e. to 47 in FIG. 4, using reliability evaluation values set in the above and the task description prepared by the preparer or recommended by the recommenders with high reliability evaluation value is selected. However, if selection is made only by the reliability evaluation value, task description distributed as test version by a reliable developer, i.e. a developer with high reliability evaluation value, or the task description, which is recommended by a reliable user but is related to the task for applications other than those of the user, may be selected, and this may lead to inconveniences.

Thus, to cope with such problems, the guarantee grade 49 and the recommendation grade 51 described in the task description will be used in the present arrangement. As described above, the guarantee grade 49 and the recommendation grade 51 are the measures to represent reliability evaluated by the preparer or the recommender of the task description.

First, the guarantee grade 49 is set as a part of the condition description 42 by the preparer of task description. This guarantee grade 49 is a grade to show how far it is possible to guarantee for the presence of bug and support system when the task description is utilized, and it can be set by the grades such as A–E. In the selection mechanism based on reliability in the present arrangement example, the grades thus set are converted to integer of 0 to 10 and are used. The higher the numerical value is, the higher the degree of guarantee by the preparer to the task description is, and the higher the reliability is.

The recommendation grade 51 is set as a part of the condition description 42 by the recommender of task description. As described already, the grades such as C–E may be used for the recommendation grade 51, and in the selection mechanism based on reliability in the present arrangement example, the grades thus set are converted to integer value of 0 to 6 and are used. Here again, the higher the numerical value is, the higher the degree of guarantee of the recommender to the task description is, and the higher the reliability is.

Figure 5:
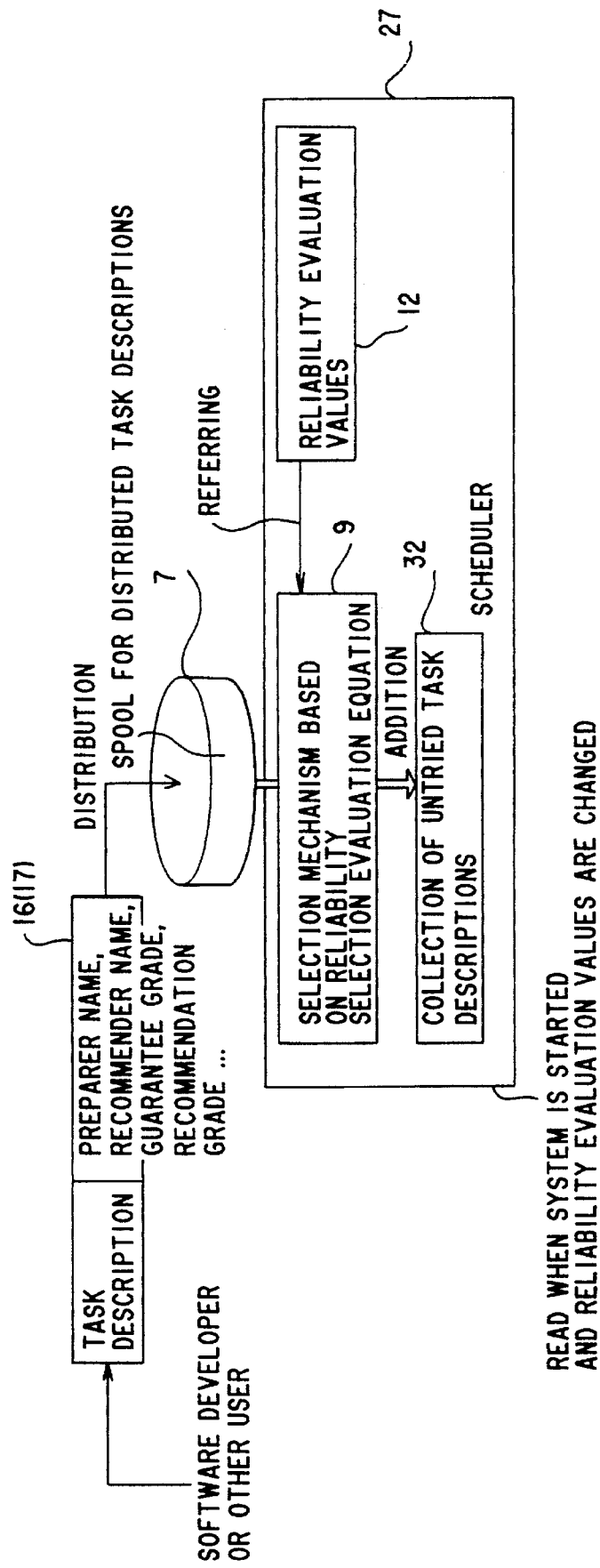
FIG. 5 is an example of a selection mechanism based on reliability an embodiment of the present invention.

FIG. 5 is to explain the action of selection mechanism based on reliability, and the newly distributed task description or addition of recommendation reasons to the existing task description are performed non-synchronously with the task execution of the user. The distributed task descriptions 16 and 17 are accumulated in a spool 7 prepared for each user. This spool 7 corresponds to the task description holding means shown in FIG. 1.

The scheduler 27 executes selection based on reliability when the system in the present arrangement example of FIG. 2 is started and when the user updates the reliability evaluation values. That is, the scheduler selects task description or task description group satisfying the selection evaluation equation described below from a collection of task descriptions accumulated in the spool 7, using values such as reliability evaluation value or guarantee grade or recommendation grade given in the task description and adds the task description or task description group thus selected to a collection 32 of untried task description. The collection 32 of untried task description is an object for filtering in the context-sensitive selection mechanism, which is the next filtering stage.

The following is an example of the selection evaluation equation:

$$\text{Selection evaluation equation: (guarantee grade} \times \text{reliability evaluation value} + \Sigma(\text{recommendation grade} \times \text{reliability evaluation value})) > 50$$

This selection evaluation equation means that the task description is to be selected when the value on left side member exceeds 50. By such an evaluation equation, the task description prepared by a preparer with low reliability evaluation value is difficult to be selected. Further, even when the preparer has low reliability, if there are many recommenders for the task description, the task description is more likely to be selected. On the contrary, even when the preparer has high reliability, if the preparer himself cannot guarantee the reliability due to reason such as it is a test version, the task description is difficult to be selected.

Next, description will be given on the context-sensitive selection mechanism using FIG. 6.

As already described, this context-sensitive selection mechanism selects the utilization pattern relatively useful compared with a conventional task execution pattern, based on the assumption that the task description more suitable for the current context of the user is more useful.

The context-sensitive selection mechanism in the present arrangement example selects the task description more suitable for the current context of the user from a collection 32 of untried task descriptions selected by the selection mechanism based on reliability as explained already and delivers it to the context-sensitive disclosure mechanism of the next stage. In the system shown in FIG. 2, this context-sensitive selection mechanism is actualized by the scheduler 27 and the dialog manager 28, which are system agents. In the present arrangement example, the context-sensitive selection mechanism is started when a message agreeing with trigger term in the starting condition 45 of the task description is delivered to the communication channel 25.

Figure 6:
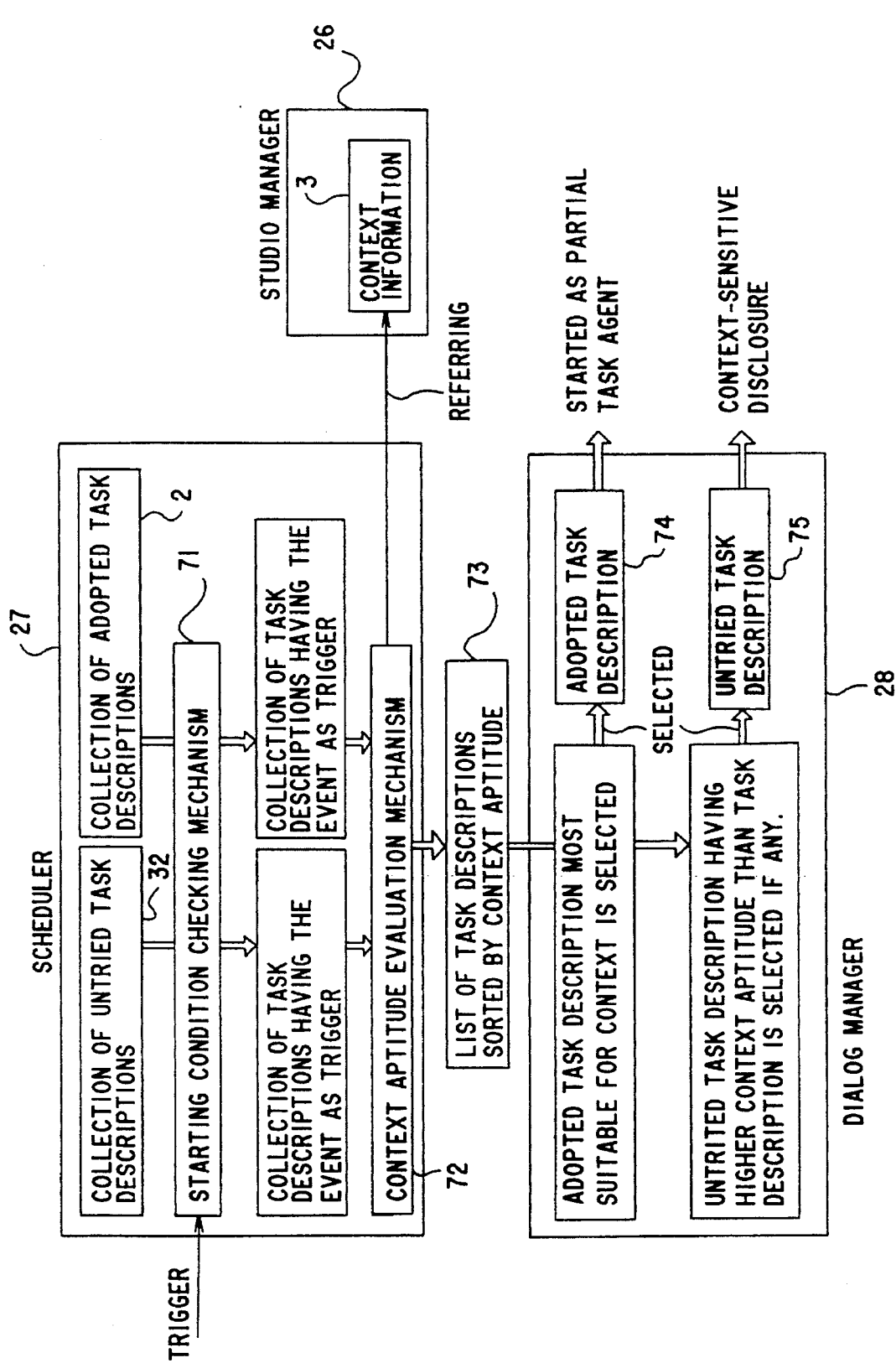
FIG. 6 is an example of a context-sensitive selection mechanism in an embodiment of the present invention.

Description is now given on action of the context-sensitive selection mechanism, referring to FIG. 6.

As described already, the task model 2 is a collection of adopted task descriptions, and the task description is in form of:

Task description::=task name # condition description # action description # status term The starting condition in this condition description is in form of:

Starting condition::="Starting condition" # trigger # context condition

Here, context-sensitive selection is started with delivery of a message agreeing with the trigger term as trigger. A starting condition checking mechanism 71 in the scheduler 27 checks the starting condition of each task description in the collection 32 of untried task descriptions and selects a collection of task descriptions having an applicable event as trigger.

Among the task description groups thus selected, there are generally two or more task descriptions, in which the context condition complies with the current context information. Thus, the context aptitude evaluation mechanism 72 in the scheduler 27 determines priority of these task descriptions by evaluating context aptitude, which indicates degree of collating between the context condition and the context information. The context aptitude is evaluated by referring to the accumulated context information in the studio manager 26 and by pattern matching to find out whether the context information satisfies all of the context conditions or As a result, a list 73 is prepared, in which priority of the task description or the task description group satisfying context condition is determined by context aptitude, and the list is transmitted to the dialog manager 28.

The dialog manager 28, which is a system agent, refers to a status term 44 of each task description in the list 73 of task descriptions with priority given by context aptitude, and selects an adopted task description having the starting condition most suitable for the current context, i.e. a task description 74 having "adopted" status term Then, it starts the partial task agent, which executes action defined by action description of the task description 74.

Also, the dialog manager 28 selects a task description from the list 73 of the task descriptions with priority when there is an untried task description 75 having higher context aptitude than the adopted task description 74. In case there are two or more task descriptions, which fall under such a condition, a task description having the highest context aptitude is selected. Then, this task description 75 is deleted from the collection 32 of untried task descriptions, and it is delivered to the context-sensitive disclosure mechanism of the next stage. It is needless to say that context-sensitive disclosure is not carried out when there is no untried task description having higher context aptitude than the adopted task description 74.

Figure 7:
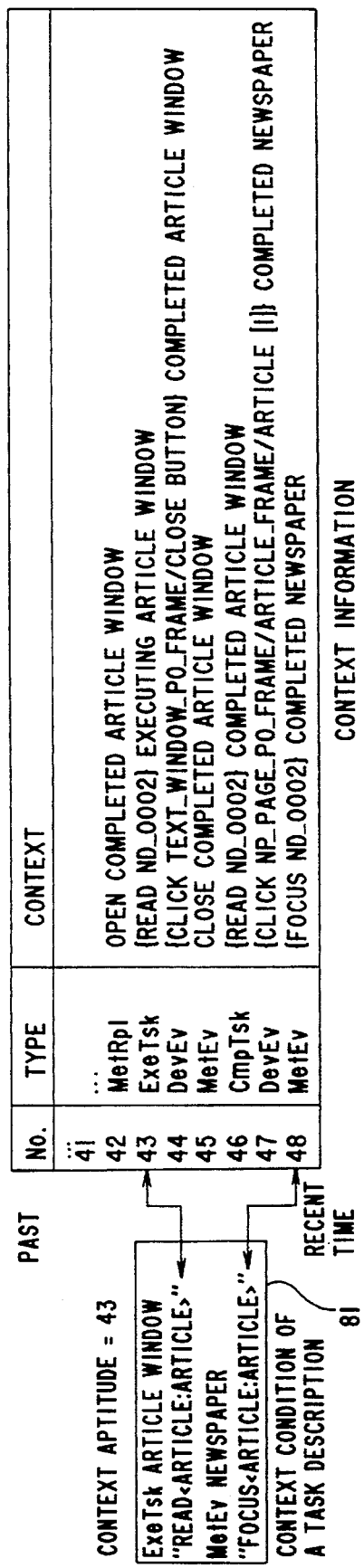
FIG. 7 explains an example of context aptitude evaluation in an embodiment of the present invention.
Figure 10:
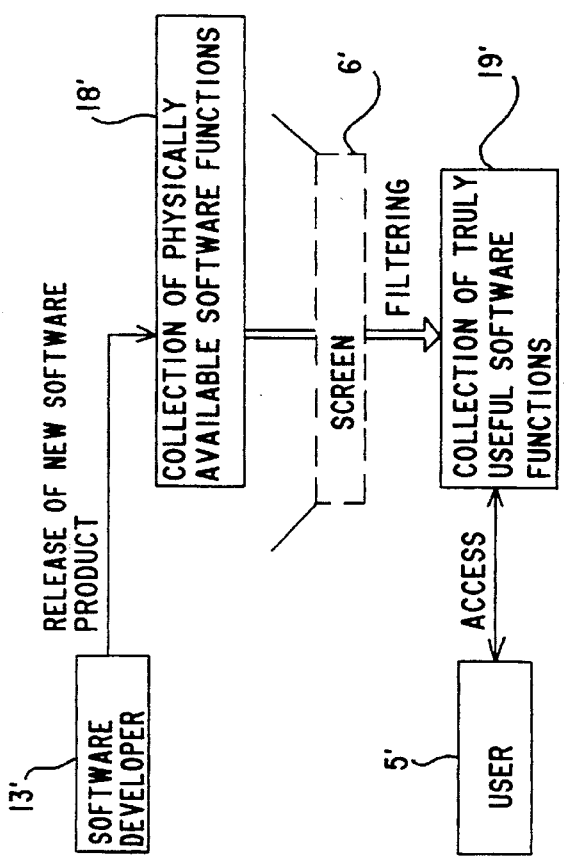
FIG. 10 is a drawing for explaining general concept of a filtering mechanism.

In the above, it is described that context aptitude is evaluated by pattern matching between context information and context condition. One example is given in FIG. 7.

The context condition is in form of:

Context condition::=Message pattern*

In the context aptitude evaluation, a message string matching the series of message pattern of context condition is found out from message history accumulated as context information, and from the complied message strings, the one having the lowest number is regarded as context-apt. In the example shown in FIG. 7, the message string comprising 43rd and 48th messages complies with the context condition 81. Thus, 43rd message having lower number has context aptitude.

Next, description will be given on the context-sensitive disclosure mechanism.

An effective method to subjectively evaluate the trade-off associated with adoption of the new utilization pattern within short time is that the user tries the new utilization pattern by the context for actual task execution. The context-sensitive disclosure mechanism in the present arrangement example offers a chance to try the new utilization pattern for the user by dynamically and selectively disclosing the new utilization pattern selected by the context-sensitive selection mechanism while the user is executing the relevant task.

In the present arrangement example in FIG. 2, the context-sensitive disclosure is carried out by the dialog manager 28. The dialog manager 28 discloses the new utilization pattern selectively, dynamically and without interfering with the user, using a comment term described in untried task description 79 having higher context aptitude and selected by the context-sensitive selection.

FIG. 8 and FIG. 9 each represents an example of the context-sensitive disclosure and shows the case where a television program metaphor environment designed by another developer is newly added to an existing newspaper metaphor environment.

[Newspaper metaphor environment]

The software product shown in FIG. 8 (1) is a newspaper metaphor environment. This software is provided with functions to retrieve data base and to present the result of the retrieval to the user in a form simulating a newspaper as shown in the figure. By clicking a newspaper icon 91 appearing on the screen, "today's news" retrieved from news article data base is shown in form of a newspaper. Further, by clicking an article title given by 92, the article in question is enlarged and displayed as given by 93.

[Addition of television program metaphor environment]

To this environment, a television program metaphor environment, which is a newly developed software product, is added. The added television program metaphor environment provides the following two functions:

(1) A function to present the result of retrieval of data base to the user in a form simulating television program;
(2) A function to retrieve group of articles related to the article on display by the above function and to present the retrieved group to the user in a form simulating newspaper using the existing newspaper metaphor environment.

[Disclosure of the first function]

The user is able to know the presence of the new television program metaphor environment because an icon 94 similar to television newly appears on the screen as shown in FIG. 8 (2). When the user takes note of the new icon 94 and clicks the icon 94, the first function of the television program metaphor environment is disclosed to the user as shown in FIG. 8 (3). The user becomes aware that "today's news" can be seen in form of television by action of the dialog manager displayed on the screen. The message by the dialog manager displayed on the screen is described as the comment term 48 in task description by the developer of the television program metaphor environment. When the user further clicks a dialog manager icon 95, simulating woman's face, the first function by the television program metaphor environment is started, and the results of retrieval of data base are sequentially presented in form of television program as shown in FIG. 9 (4).

[Disclosure of the second function]

The second function of television program metaphor environment is first disclosed when the user clicks newspaper icon under the context that news is seen by television program metaphor environment. Namely, to the clicking of newspaper icon, the function to see "today's news" of the newspaper metaphor environment on newspaper is started as in the past, while the dialog manager appears on the screen at the same time as shown in FIG. 9 (5) and notifies to the user that it is possible to start the function to see the article group related to the article of the newly added program on the newspaper. When the user clicks the dialog manager icon 95, this function is started, and the display of newspaper is changed from "today's news" to the article group related to article of the program.

[Adoption or rejection of the function]

When the user tries the new function as described above and then completes the new function, the dialog manager icon 95 appears again on screen as shown in FIG. 9 (6) and asks the user to select whether the condition description started the function should be adopted in future or not. The message in this case is generated from the starting condition explanation term in task description and the comment term. The task description ultimately adopted by the user is added to a collection 2 of the adopted task descriptions.

The disclosure of the function in this example is selective in that the presence of two functions of the product are not made known to the user at the same time. Also, the presence of each function is disclosed dynamically at the time when the context matches the condition described in the context condition of task description described by the developer.

As explained above, the context-sensitive disclosure mechanism follows task description selected by the context-sensitive selection mechanism and discloses the new functions to the user dynamically and selectively. By dynamically disclosing the new function in accordance with the context of task execution, the user tries the selected function, and it becomes easier to evaluate and judge whether the function in question is useful or not in the task. Also, it appears that, by disclosing selectively only the function suitable for the context, the user learns how to use, and the load to evaluate usefulness is turned to relatively lower load compared with the case where the new product is disclosed as a whole. Also, the user can neglect the disclosure of the new function and can continue the operation as in the past.

In the above, description has been given on an embodiment of the present invention, while the present invention is not limited to the above embodiment, and various changes and modifications can be made. For example, in the above embodiment, there are provided a selection mechanism based on reliability, a context-sensitive selection mechanism and a context-sensitive disclosure mechanism as the filtering means, whereas it has been confirmed by the present inventors that the selection mechanism based on reliability may be omitted.

As it is evident from the above description, there are provided in the present invention task description holding means for holding a collection of task descriptions formally describing individual utilization patterns of various types of software functions and filtering means for finding and selecting a task description describing utilization pattern, not tried by the user in the past and regarded as useful to the user, from a collection of task descriptions held by said task description data holding means, and for disclosing it to the user. Accordingly, by adding the task description selected by the filtering means to the task model, it is possible to change said task model during task execution. As a result, it is possible to automatically and efficiently find and select a collection of the software functions truly useful for the user from a collection of an enormous amount of physically available software functions, and also to adequately and easily judge whether the software function should be adopted or not through trial use of the software function thus selected.

What we claim are:

1. A computer system, comprising:

task model holding means for holding a task model, which is a collection of knowledge, modeled after task execution pattern of a user;

context information holding means for holding context information, which is a knowledge to represent a context of task execution of the user, sequentially calculated and updated based on input information from task model and operation series of the user;

task execution means for making access to software functions necessary to task execution wanted by the user referring to the task model and the context information based on input operation by the user and for converting the results of execution of the software functions to adequate expression to present to the user, referring to the task model and context information;

whereby there are further provided:

task description holding means for holding a collection of task descriptions formally describing individual utilization patterns of the software functions; and filtering means for finding and selecting a task description describing utilization pattern, not tried by the user in the past and regarded as useful to the user, from a collection of task descriptions held by the task description holding means, and for disclosing it to the user.

2. A computer system according to claim 1, wherein said filtering means is provided with:

context-sensitive selection mechanism for selecting a task description suitable for context of the current task execution using said context information; and context-sensitive disclosure mechanism for offering a chance for the user to try to use a utilization pattern of a task description selected by said context-sensitive selection mechanism in the context of actual task execution.

3. A computer system according to claim 1, wherein said filtering means is provided with:

a selection mechanism based on reliability for selecting a task description prepared or recommended by a reliable person, selected according to reliability evaluation values set explicitly by the user from a collection of task descriptions not tried by the user in the past;

a context-sensitive selection mechanism for selecting a task description suitable for a context of the current task execution using said context information; and context-sensitive disclosure mechanism for offering a chance to try to use a utilization pattern of task description selected by the selection mechanism based on reliability and the context-sensitive selection mechanism in the context of actual task execution.

* * * * *